(12) United States Patent
Lozano

(10) Patent No.: US 10,570,886 B2
(45) Date of Patent: Feb. 25, 2020

(54) AIRBORNE DEVICE

(71) Applicant: INSTITUT POLYTECHNIQUE DE GRENOBLE, Grenoble (FR)

(72) Inventor: Rogelio Lozano, Grenoble (FR)

(73) Assignee: Institut Polytechnique de Grenoble, Grenoble (FR)

( * ) Notice: Subject to any disclaimer, the term of this patent is extended or adjusted under 35 U.S.C. 154(b) by 449 days.

(21) Appl. No.: 15/326,705

(22) PCT Filed: Jul. 15, 2015

(86) PCT No.: PCT/FR2015/051936
§ 371 (c)(1),
(2) Date: Jan. 17, 2017

(87) PCT Pub. No.: WO2016/012695
PCT Pub. Date: Jan. 28, 2016

(65) Prior Publication Data
US 2017/0210467 A1      Jul. 27, 2017

(30) Foreign Application Priority Data

Jul. 21, 2014   (FR) ..................................... 14 57001

(51) Int. Cl.
| A63H 27/08 | (2006.01) |
| B63H 9/06 | (2006.01) |
| F03D 9/32 | (2016.01) |
| F03D 9/25 | (2016.01) |
| B64C 31/06 | (2020.01) |
| F03D 5/00 | (2006.01) |

(52) U.S. Cl.
CPC ............. *F03D 9/32* (2016.05); *B63H 9/0685* (2013.01); *B64C 31/06* (2013.01); *F03D 5/00* (2013.01); *F03D 9/25* (2016.05)

(58) Field of Classification Search
CPC ................ A63H 27/082; B63H 9/0685; B63B 25/7976; B64C 39/022; B64C 31/06; B64C 2201/107; F03D 5/00
See application file for complete search history.

(56) References Cited

U.S. PATENT DOCUMENTS

| 2007/0126241 A1* | 6/2007 | Olson ........................ F03D 5/04 290/55 |
| 2010/0221112 A1 | 9/2010 | Bevirt et al. |
| 2011/0114002 A1 | 5/2011 | Handler |
| 2012/0086210 A1* | 4/2012 | Gray ........................ F03D 5/00 290/55 |

(Continued)

FOREIGN PATENT DOCUMENTS

| WO | 2011121557 A1 | 10/2011 |
| WO | 2013151678 A1 | 10/2013 |

*Primary Examiner* — Philip J Bonzell
*Assistant Examiner* — Tye William Abell
(74) *Attorney, Agent, or Firm* — The Noblitt Group, PLLC

(57) ABSTRACT

The invention concerns an airborne device comprising at least three supporting wings and a linking device, the wings being linked to each other by first flexible cables, each wing being further linked to the linking device by a second flexible cable, the linking device being linked to a third flexible cable intended to be linked to a base, the first second, and third cables being tensioned when the airborne device is carried in the wind.

11 Claims, 3 Drawing Sheets

(56) References Cited

U.S. PATENT DOCUMENTS

| | | | |
|---|---|---|---|
| 2013/0078097 A1* | 3/2013 | Milanese | F03D 5/00 416/170 R |
| 2014/0001308 A1* | 1/2014 | Costa Duarte Pardal | B64B 1/02 244/29 |
| 2014/0210212 A1* | 7/2014 | Hardy | F03D 5/00 290/55 |
| 2014/0232114 A1* | 8/2014 | Goldstein | F03D 5/00 290/44 |
| 2015/0008678 A1* | 1/2015 | Goldstein | F03D 5/02 290/55 |

* cited by examiner

AIRBORNE DEVICE

CROSS-REFERENCES TO RELATED APPLICATIONS

This application claims the benefit of International Application Application No. PCT/FR2015/051936, filed Jul. 15, 2015 and claims the priority benefit of French patent application FR14/57001, filed on Jul. 21, 2014 and incorporates the disclosures of each application by reference.

BACKGROUND

The present application relates to an airborne device for the conversion of the kinetic energy of wind into mechanical energy. Airborne devices used to convert the kinetic energy of wind into mechanical energy generally comprise a kite or an aerostat An advantage is that such airborne devices may be used at high altitudes where winds are generally stronger and/or more regular than at lower altitudes.

The airborne device may be used to pull a vehicle, for example, a boat. The airborne device may be used to drive an electric power generator. The electric power generator may be supported by the airborne device or be located on ground. The airborne device then forms an airborne wind turbine which enables to convert the kinetic energy of wind into electric power.

A disadvantage of airborne devices, particularly when they are used as an airborne wind turbine, is their low efficiency, in particular as compared with a conventional wind turbine. Further, the structure of airborne devices may be complex and the control of the trajectory followed by the airborne device may be difficult.

SUMMARY

An object of an embodiment aims at overcoming all or part of the disadvantages of the previously-described airborne devices used to convert the kinetic energy of wind into mechanical energy.

Another object of an embodiment is to increase the efficiency of the airborne device.

Another object of an embodiment is for the airborne device to have a simple structure.

Another object of an embodiment is for the trajectory followed by the airborne device to be simply controlled.

For this purpose, an embodiment provides an airborne device comprising at least three airfoil wings and a connecting device, the wings being connected together by first flexible cables, each wing being, further, connected to the connecting device by a second flexible cable, the connecting device being connected to a third flexible cable intended to be connected to a base, the first, second, and third cables being stretched when the airborne device is placed in wind.

According to an embodiment, the device comprises no rigid frame connecting the wings together.

According to an embodiment, the connecting device comprises a first portion connected to a second portion, the second cables being attached to the first portion and the third cable being attached to the second portion, the first portion being capable of pivoting with respect to the second portion.

According to an embodiment, at least one of the wings comprises at least one first actuator capable of modifying the length of the portion of one of the first cables stretched between said wing and one of the other wings.

According to an embodiment, at least one of the wings comprises a second actuator capable of modifying the length of the portion of the second cable stretched between said wing and the connecting device.

According to an embodiment, each wing is connected to at least two other wings by at least two first cables.

According to an embodiment, each wing comprises first actuators capable of independently modifying the lengths of the portions of said at least two first cables stretched between said wing and the two other wings.

According to an embodiment, the device comprises at least two pairs of wings, the two wings of each pair being connected together by one of the first cables, each wing of each pair being connected to at least one of the wings of the other pair by another one of the first cables.

According to an embodiment, the span of each wing is in the range from 5 m to 50 m.

According to an embodiment, at least one of the wings comprises an upper surface connected to a lower surface by a leading edge, a trailing edge, and first and second lateral edges, the wing chord increasing and then decreasing from the first lateral edge to the second lateral edge.

According to an embodiment, for each wing, at least one of the first cables penetrates into the wing through the lateral edge of the wing which is most inside of the airborne device when the airborne device is placed in wind.

According to an embodiment, for each wing, the second cable penetrates into the wing through the lower surface of the wing.

An embodiment also provides an electric power generation system, comprising an airborne device such as previously defined and an electric power generator connected to the third cable of the airborne device.

An embodiment also provides a transport system, comprising an airborne device such as previously defined and a vehicle, particularly a boat, connected to the third cable of the airborne device.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
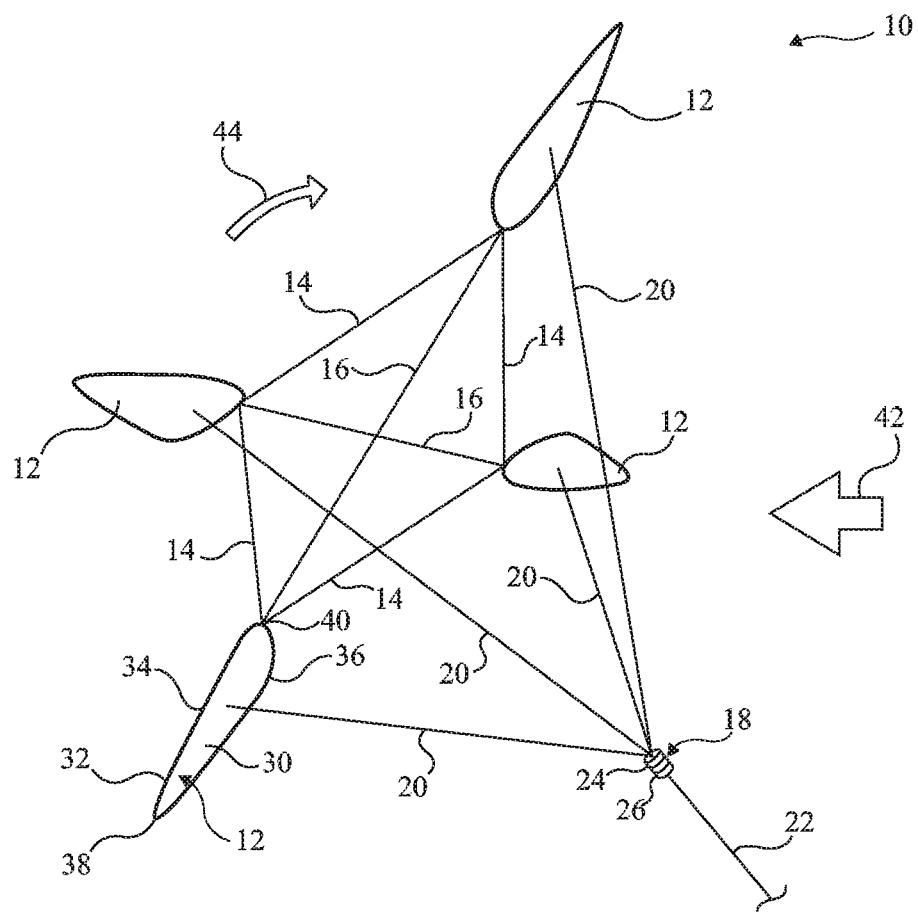
FIG. 1 is a partial simplified perspective view of an embodiment of an airborne device.

For clarity, the same elements have been designated with the same reference numerals in the various drawings and, further, the various drawings are not to scale. In the following description, unless otherwise indicated, terms "substantially," "about," "approximately," and "in the order of" mean "to within 10%."

FIG. 1 shows an embodiment of an airborne device 10. Airborne device 10 comprises at least three wings, for example, from three to eight wings 12. Preferably, airborne device 10 comprises an even number of wings 12. Wings 12 are connected together by flexible cables. A flexible cable is a cable which may, under the action of an external force, deform, and particularly bend, without breaking or tearing. There is no rigid frame connecting wings 12 together. As an example, in the case where airborne device 10 comprises four wings 12, each wing 12 is connected to each adjacent wing by a flexible cable 14 and is connected to the opposite wing by a flexible cable 16. Further, each wing 12 is connected to a connecting device 18 by a flexible cable 20. Connecting device 18 is connected to an anchoring circuit, not shown, by a flexible cable 22. According to the envisaged application, the anchoring system may be on ground, on a buoy, or on a ship. According to an embodiment, connecting device 18 comprises a first portion 24 having cables 20 attached thereto and connected to a second portion 26 having cable 22 attached thereto. First portion 24 is capable of pivoting with respect to second portion 26 around the axis of cable 22. Connecting device 18 may correspond to a swivel.

Each wing 12 corresponds to an airfoil comprising a lower surface 30 connected to an upper surface 32 by a leading edge 34, a trailing edge 36, an outer lateral edge 38, directed towards the outside of device 10, and an inner lateral edge 40, directed towards the inside of device 10. Each wing 12 may correspond to a profiled wing, for example, having a NACA profile.

According to an embodiment, for each wing 12, cable(s) 14 and 16 are substantially connected to the same point of inner lateral edge 40. According to an embodiment, for each wing 12, cable 20 is connected to wing 12 at a point of lower surface 30 at a distance from leading edge 34, from the trailing edge, from outer lateral edge 38, and from inner lateral edge 40. As a variation, cable 20 may be connected to inner lateral edge 40.

Airborne device 10 operates as follows. Under the action of wind, schematically shown by arrow 42, wings 12 displace under the effect of lift forces. Centrifugal forces tend to radially separate wings 12, so that cables 14 and 16 are permanently stretched. A rotating motion of wings 12 is then obtained, which is shown in FIG. 1 by arrow 44. The lift forces exerted on each wing 12 result in pulling cables 20, and thus in pulling cable 22. A conversion of the kinetic energy of wind 42 into mechanical energy for pulling cable 22 is thus obtained. Preferably, cable 20 is connected to lower surface 30 so that the longitudinal axis of wing 12 is aligned with cable 16.

Wings 12 of airborne device 10 rotate as the blades of a wind turbine on ground. The present embodiment is based on the fact that, for a conventional wind turbine on ground, the blade portions which are, in operation, the most efficient to capture the kinetic energy of wind, are located close to the free ends of the blades, where the drive torque due to wind is the highest. Wings 12 are thus located in useful areas where the drive torque due to wind 42 is the highest and cables 14, 16, 20 are located in areas where the drive torque due to wind 42 is low. Thereby, the surface area described by wings 12 during their motion may be large while the airborne device has a simple structure and a small weight.

Preferably, the maximum diameter in operation of airborne device 10 is in the range from 20 m to 200 m, preferably from 100 m to 150 m. The weight of airborne device 10, without counting cable 22, may be in the range from 20 kg to 20 tons. The rotation speed in operation of the wings may be in the range from 1.5 to 200 revolutions per minute.

Figure 2:
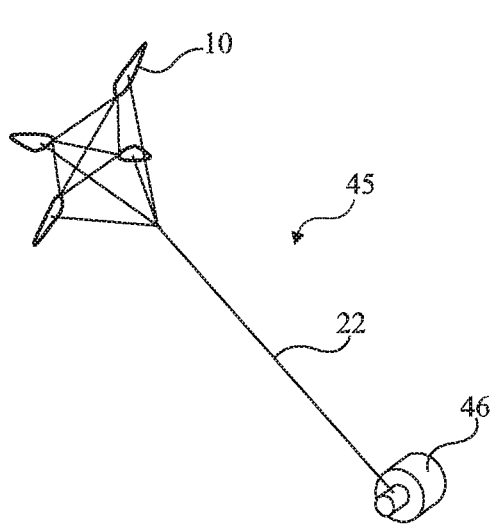
FIG. 2 is a partial simplified perspective view of an electric power generation system comprising the airborne device shown in FIG. 1.

FIG. 2 shows an embodiment of an electric power generation system 45 where cable 22 of airborne device 10 is connected to an electric power generator 46. As a variation, each wing 12 may comprise an electric power generator comprising a turbine driven during the displacement of wing 12. The generated electric power may then be transmitted to ground by cables 20 and 22.

Figure 3:
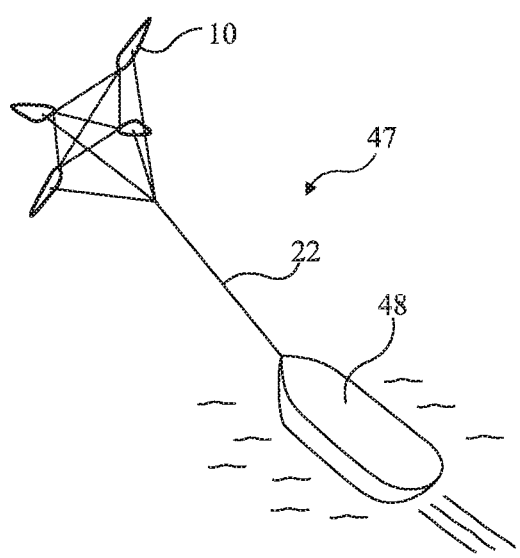
FIG. 3 is a partial simplified perspective view of a transport system comprising the airborne device shown in FIG. 1.

FIG. 3 shows an embodiment of a transport system 47 where cable 22 of airborne device 10 is connected to a vehicle 48, in the present example, a ship. Airborne device 10 is then used as means for pulling vehicle 48.

Figure 4:
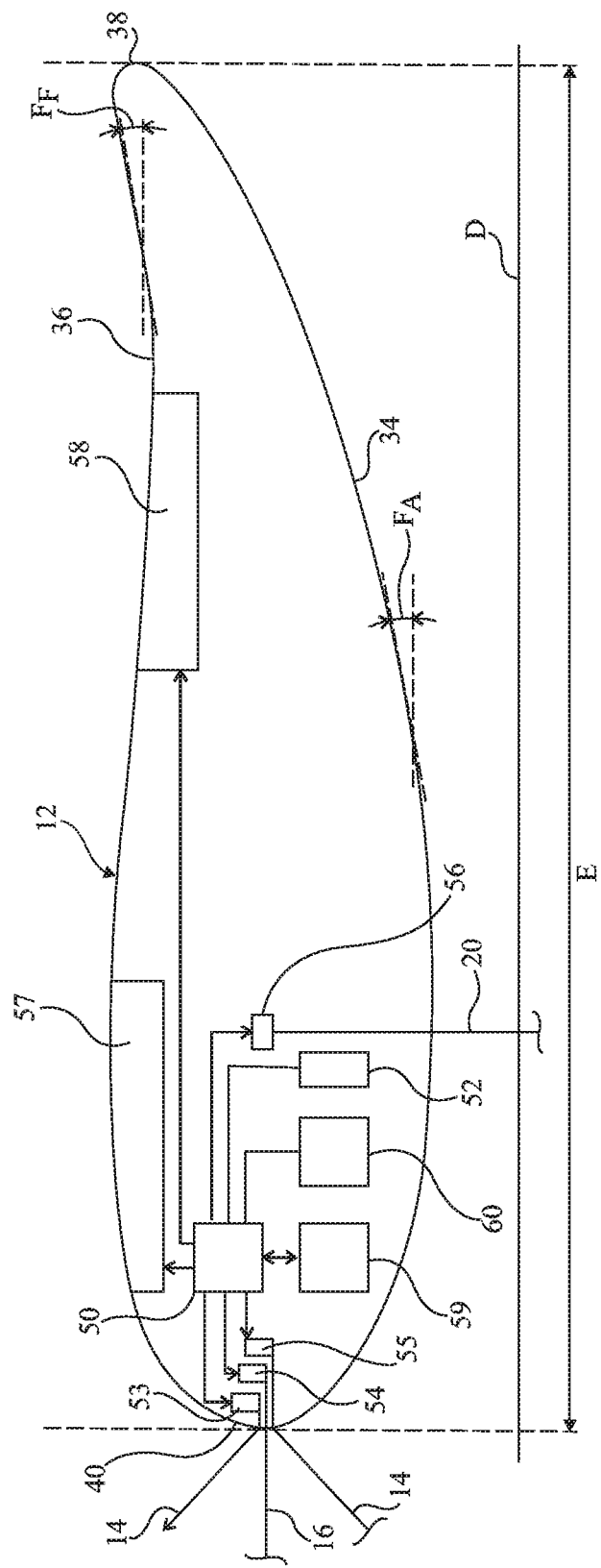
FIG. 4 is a partial simplified top view of an embodiment of a wing of the airborne device shown in FIG. 1.

FIG. 4 is a simplified view of an embodiment of one of wings 12 of airborne device 10 shown in FIG. 1. Each wing 12 of airborne device 10 may have substantially the structure shown in FIG. 4. Wing 12 forms a partially hollow enclosure and a plurality of elements arranged in the internal volume of wing 12 have been schematically shown in FIG. 4. Wing 12 is for example made of composite materials. Cables 14, 16, 20 may be made of synthetic fibers, particularly the product commercialized under trade name Kevlar.

In the following description, longitudinal axis D of the wings designates an axis perpendicular to the two most distant parallel planes, one of them being tangent to the outer lateral edge 38 and the other one being tangent to inner lateral edge 40. Span E of wing 12 is the distance between these planes. Span E is in the range from 5 m to 50 m, preferably from 25 m to 35 m. The chord of wing 12, measured in a plane perpendicular to longitudinal axis D, is not constant along axis D. The chord increases from inner lateral edge 40 to a maximum chord and then decreases towards outer lateral edge 38. The maximum chord is in the range from 0.25 m to 5 m, preferably, from 1.25 m to 3.5 m. The maximum chord is substantially located between 10% and 45%, preferably between 15% and 30%, of the span away from inner lateral edge 40. 50% of the span away from inner lateral edge 40, the ratio of the chord to the maximum chord is in the range from 60% to 100%, preferably from 70% to 90%. The maximum thickness between the upper surface and the lower surface is in the range from 7% to 25% of the value of the chord at this location, preferably from 8% to 15% of the value of the chord at this location. Each cable 14, 16, 20 has an average diameter in the range from 5 mm to 10 cm.

Leading edge sweep $F_A$ designates the angle between axis D and a plane tangent to leading edge 34. The sweep is positive when the angle, directed from axis D to the tangent plane, is in the counterclockwise direction when looking at the upper surface of the wing, and negative in the opposite case. According to an embodiment, leading edge sweep $F_A$ varies along axis D from inner lateral edge 40 to outer lateral edge 38. According to an embodiment, leading edge sweep $F_A$ is successively, as the distance from inner lateral edge 40 increases along axis D, negative and decreases in absolute value as the distance from inner lateral edge 40 increases along axis D, cancels and is then positive and increases towards outer lateral edge 38. According to an embodiment, 20% of the span away from inner lateral edge 40, the sweep of leading edge 34 is in the range from −20 degrees to 5 degrees, and 60% of the span away from inner lateral edge 40, the sweep of leading edge 34 is in the range from 0 degrees to 10 degrees. Trailing edge sweep $F_F$ designates the angle between a plane tangent to trailing edge and axis D.

According to an embodiment, trailing edge sweep $F_F$ varies along axis D from inner lateral edge 40 to outer lateral edge 38. According to an embodiment, trailing edge sweep $F_F$ is successively, as the distance from inner lateral edge 40 increases along axis D, positive, zero, negative, zero, and positive. According to an embodiment, 20% of the span away from inner lateral edge 40, trailing edge sweep $F_F$ is in the range from 30 degrees to 0 degrees, and 60% of the span away from inner lateral edge 40, trailing edge sweep $F_F$ is in the range from −10 degrees to 10 degrees.

Wing 12 may comprise a twist, that is, the angle between the chord and a reference plane, or pitch angle, may vary along axis D.

Wing 12 comprises:
- a control unit 50, for example comprising a processor;
- sensors 52, connected to control unit 50, for example, a speed sensor, a wing position sensor, for example, a GPS (Global Positioning System), gyroscopes, accelerometers, a pitot tube, magnetometers, and a barometer;
- actuators 53, 54, 55, 56, each actuator 53, 54, 55, 56 being controlled by control unit 50 and being connected to one of cables 14, 16, 20;
- at least one mobile trailing edge spoiler, two mobile spoilers 57, 58 being shown in FIG. 4;
- a remote communication unit 59 connected to control unit 50; and
- a battery of accumulators 60 for powering control unit 50, actuators 53, 54, 55, 56, and the drive motors of spoilers 57, 58.

As a variation, battery 60 may be replaced with an electric power generator. As a variation, the electric power for supplying control unit 50, drive motors 54 of cables 14, 16, 20, and drive motors of spoilers 57, 58 may be conveyed to each wing via cables 20 and 22.

Each actuator 53, 54, 55, 56 is capable of modifying the length of the stretched portion of cable 14, 16, or 20 outside of wing 12. As an example, each actuator 53, 54, 55, 56 is capable of unwinding or of winding the cable 14, 16, 20 to which it is connected. The length of the portion of each cable 14, 16 extending between two wings 12 and the length of the portion of each cable 20 extending between a wing 12 and connecting device 18 may thus be modified.

The control unit 50 of each wing 12 is capable of remotely exchanging signals, via communication unit 59, with the control units 50 of the other wings 12, for example, according to a high-frequency type remote data transmission method. The control unit 50 of each wing 12 may further be capable of remotely exchanging signals, via communication unit 59, with a ground station.

The control of the incidence of each wing 12 is performed by control unit 50 by modifying the inclination of spoilers 57, 58 and by modifying the length of the portions of cables 14, 16, and 20 stretched in operation between wings 12 or between wings 12 and connecting device 18. According to an embodiment, the incidence of each wing 12 may be cyclically modified during a revolution of wing 12. According to another embodiment, in the case where airborne device 10 is connected to an electric power generator 46, the operation of electric power generator 46 may comprise an alternation of first and second phases. In each first phase, the incidences of wings 12 are controlled to increase the pulling efforts exerted by airborne device 10, airborne device 10 moving away from electric power generator 46. In each second phase, the incidences of wings 12 are controlled to decrease the pulling efforts exerted by airborne device 10 on cable 22 to be able to bring airborne device 10 closer to generator 46 while spending a minimum quantity of energy.

Further, when airborne device 10 is lifted from the ground up to an operating altitude, the stretched portions of 14, 16, 20 between wings 12 or between wings 12 and connecting device 18 may be initially decreased to decrease the bulk of airborne device 10.

Figure 5:
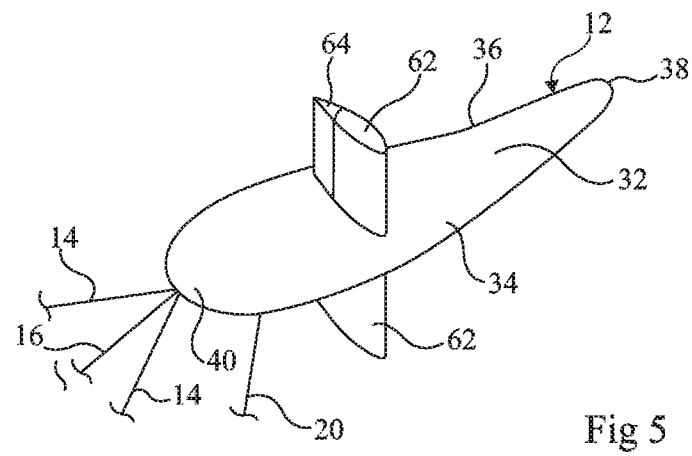
FIGS. 5 and 6 respectively are a perspective view and a front view, partial and simplified, of another embodiment of a wing of the airborne device shown in FIG. 1.
Figure 6:
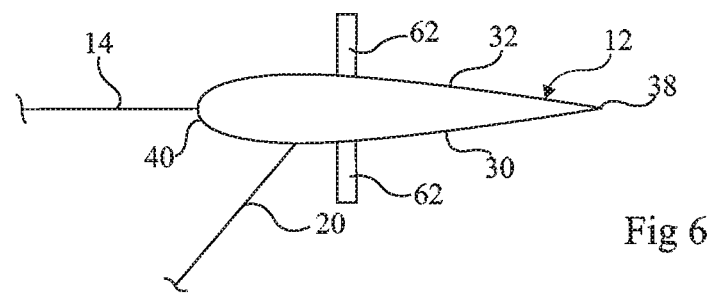

FIGS. 5 and 6 show another embodiment of wing 12 where wing 12 further comprises two stabilizers 62 which may each comprise a mobile flap 64. First stabilizer 62 protrudes from upper surface 32 and second stabilizer 62 projects from lower surface 30. The actuation of the mobile flap 64 of each stabilizer 62 is controlled by control unit 50. The actuation of mobile flap 64 especially enables to control the lateral position of airborne device 10 relative to wind 42.

Each wing 12 may be provided with a propulsion system. Before the launching of airborne device 10, wings 12 may be arranged on a support and the lengths of cables 14, 16, and 20 may be decreased. The propulsion system of each wing 12 may be actuated. This causes the stretching of cables 14, 16, and the rotating of wings 12. Under the action of lift efforts, airborne 10 rises in the air. The lengths of cables 14, 16, 20 may be progressively increased as the altitude of airborne device 10 increases, until airborne device 10 reaches the desired altitude. As soon as airborne device 10 is exposed to a sufficient wind to maintain the altitude and the rotation of airborne device 10, the propulsion systems of wings 12 may be deactivated. Propulsion systems may further be actuated in flight, while airborne device 10 is at its operating altitude, when the power of wind 42 is not sufficient to maintain airborne device 10 at this altitude.

Figure 7:
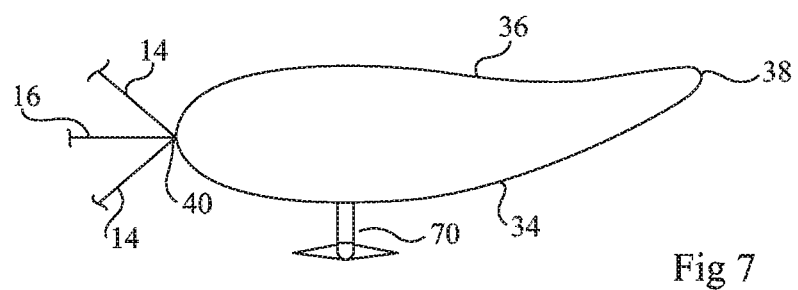
FIG. 7 is a partial simplified top view of another embodiment of a wing of the airborne device shown in FIG. 1.

FIG. 7 shows an embodiment of wing 12 where the wing propulsion system comprises a motor-driven helix 70 which projects from leading edge 34 of the wing to the front of the wing according to the rotation direction of wing 12 in operation. Motor-driven helix 70 may be controlled by control unit 50 or may be remotely controlled from a ground station. An advantage of the use of a motor-driven helix is that it further enables to displace the center of gravity of wing 12 towards the front according to the rotation of wing 12 in operation. This may be advantageous to improve the wing stability. According to an embodiment, helix 70 may be removable and at least partly folded into wing 12 when it is not being used. As a variation, the propulsion system may comprise a jet engine, particularly a rocket engine or a compressed air propulsion system.

Each wing 12 may further comprise a landing gear, not shown, which allows displacements of wing 12 on the ground. The landing gear may be removable to be at least partly folded into wing 12 when it is not being used.

Figure 8:
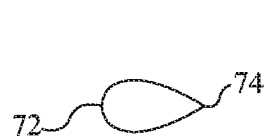
FIGS. 8 and 9 are partial simplified cross-section views of embodiments of a cable of the airborne device shown in FIG. 1.

FIG. 8 shows an embodiment where each cable 14, 16, 20, or 22 or at least one of cables 14, 16, 20, or 22 has a thinned profiled section comprising a leading edge 72 and a trailing edge 74. This enables, in particular, to decrease the cable drag.

Figure 9:
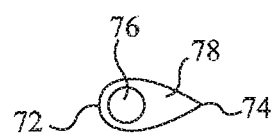

FIG. 9 shows an embodiment where each cable 14, 16, 20, or 22 or at least one of cables 14, 16, or 30 further comprises a core 76 contained within a profiled casing 78. Core 76 may be made of a first material and casing 78 may be made of a second material, the density of the first material being greater than the density of the second material. This enables to draw the center of gravity of the cable towards the leading edge and to thus improve the aerodynamic stability of the cable.

Various embodiments with different variations have been described hereabove. It should be noted that those skilled in the art may combine various elements of these various embodiments and variations without showing any inventive step. In particular, airborne device 10 may both comprise a propulsion system, such as helix 70 shown in FIG. 7, profiled cables 14, 16, 20 as shown in FIGS. 8 and 9, and a landing gear.

The invention claimed is:

1. An airborne device (10) comprising:
at least three airfoil wings (12); and
a connecting device (18),
the wings being interconnected by first flexible cables (14, 16), each wing being, further, connected to the connecting device (18) by a second flexible cable (20), the connecting device being connected to a third flexible cable (22) intended to be connected to a base (46, 48), the first, second, and third cables being stretched when the airborne device is placed in wind, wherein:
each wing (12) is connected to at least two other wings by at least two first cables (14, 16); and
each wing (12) comprises first actuators (53, 54) capable of independently modifying the lengths of the portions of said at least two first cables stretched between said wing and the two other wings.

2. The airborne device of claim 1, comprising no rigid frame connecting the wings (12) together.

3. The airborne device of claim 1, wherein the connecting device (18) comprises a first portion (24) connected to a second portion (26), the second cables (20) being attached to the first portion and the third cable (22) being attached to the second portion, the first portion being capable of pivoting with respect to the second portion.

4. The airborne device of claim 1, wherein at least one of the wings (12) comprises a second actuator (56) capable of modifying the length of the portion of the second flexible cable (20) stretched between said wing and the connecting device (18).

5. The airborne device of claim 1, comprising at least two pairs of wings (12), the two wings of each pair being connected together by one of the first flexible cables (16), each wing of each pair being connected to at least one of the wings of the other pair by another one of the first flexible cables (14).

6. The airborne device of claim 1, wherein the span of each wing (12) is in the range from 5 m to 50 m.

7. The airborne device of claim 1, wherein at least one of the wings (12) comprises an upper surface (32) connected to a lower surface (30) by a leading edge (34), a trailing edge (36), and first and second lateral edges (38, 40), the wing chord increasing and then decreasing from the first lateral edge to the second lateral edge.

8. The device of claim 7, wherein, for each wing (12), at least one of the first flexible cables (14, 16) penetrates into the wing through the lateral edge (40) of the wing (12) which is internal to the airborne device when the airborne device is placed in wind.

9. The device of claim 7, wherein, for each wing (12), the second cable (20) penetrates into the wing (12) via the lower surface (30) of the wing.

10. An electric power generation system (45) comprising the airborne device (10) of claim 1 and an electric power generator (46) connected to the third cable (22) of the airborne device.

11. A transport system (47) comprising the airborne device (10) of claim 1 and a vehicle (48), particularly a boat, connected to the third cable (22) of the airborne device.

* * * * *